United States Patent [19]
Lamperski

[11] 3,823,991
[45] July 16, 1974

[54] FRICTION BEARING

[75] Inventor: Heinrich Lamperski, Muhlhein, Germany

[73] Assignee: Glyco-Metall-Werke Daelen & Loos GmbH, Wiesbaden-Schierstein, Germany

[22] Filed: Sept. 28, 1972

[21] Appl. No.: 292,938

[30] Foreign Application Priority Data
Oct. 1, 1971  Germany............................ 2149207

[52] U.S. Cl. ............................................... 308/73
[51] Int. Cl. ............................................. F16c 17/06
[58] Field of Search ....................................... 308/73

[56] References Cited
UNITED STATES PATENTS
3,370,334  2/1968  Pilarczyk et al. .................... 308/73

Primary Examiner—Charles J. Myhre
Assistant Examiner—Frank Susko
Attorney, Agent, or Firm—Walter Becker

[57] ABSTRACT

A friction bearing which comprises a housing and at least three radial segments arranged in a guiding cage and resting against the housing. Between the guiding cage and the radial segments on one hand and the housing on the other hand there is provided a lubricant receiving chamber, while between the guiding cage and the radial segments passages are provided for the passage of lubricant.

4 Claims, 3 Drawing Figures

FRICTION BEARING

The present invention relates to a friction bearing comprising a housing and at least three radial segments resting against the housing. Friction bearings of this type, frequently also called radial segmental bearings, are known and are employed whereever high bearing strength and non-sensitivity to rotating loads are important. These friction bearings consist of at least three or more radial segments the inner concave side of which supports a shaft or the like while the back side of the radial segments rests in the housing of the respective machine part. The radius of curvature of the radial segments on their inner supporting surface and the bearing play are influential factors which are separate from each other and can be individually determined, while these factors affect the size of the hydrodynamically supporting oil film in the lubricating gap. With heretofore known friction bearings of this general character a special bearing housing is necessary for the supply and withdrawal of the lubricating oil. In the bearing housing, bores or milled out sections which are expensive to produce have to be provided for the supply and withdrawal of the lubricating oil. The radial segments are by means of special devices, for instance pins or screws, firmly held in their relative position and are, relative to the shaft to be supported, permitted to move just freely enough to provide the necessary lubricating gap.

It is, therefore, an object of the present invention to provide an improved friction bearing in which the radial segments will even in unassembled condition be fixed relative to each other and in which at the same time the lubricant supply, lubricant circulation and lubricant withdrawal will be considerably improved.

It is another object of this invention to provide a friction bearing which can be handled easier than heretofore known bearings of this type and which also will overcome the drawbacks of heretofore known friction bearings of the type involved.

These and other objects and advantages of the invention will appear more clearly from the following specification in connection with the accompanying drawings, in which.

Figure 1:
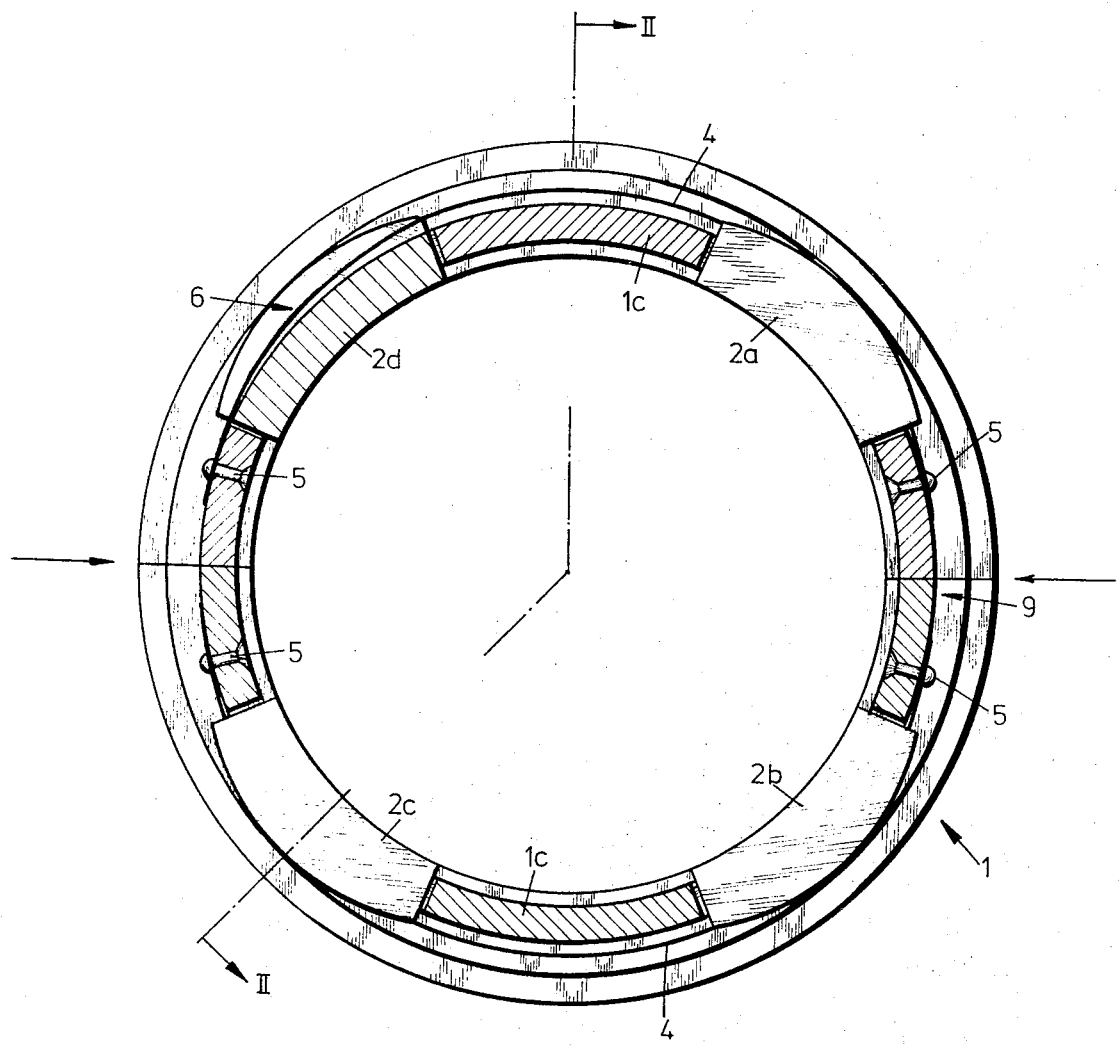
FIG. 1 illustrates a section through a friction bearing according to the present invention, said section being taken along the line I — I of FIG. 2.
Figure 2:
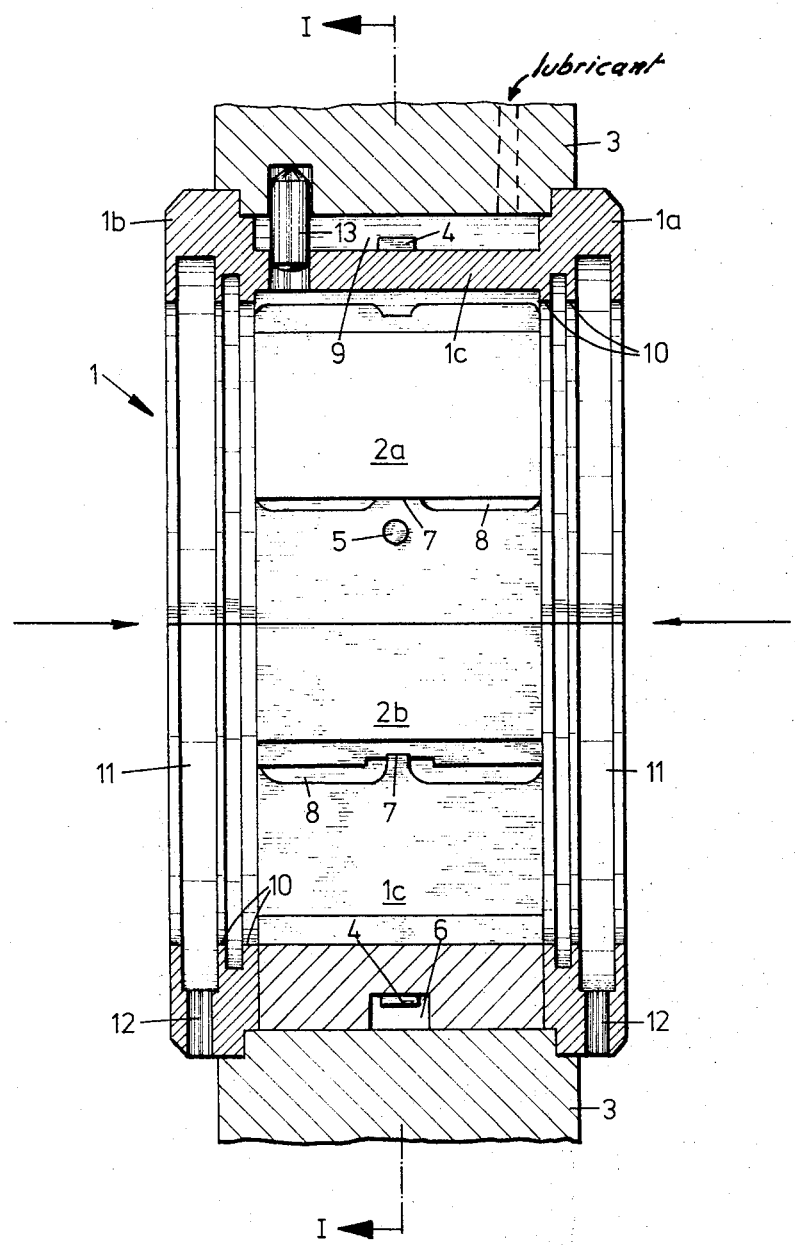
FIG. 2 is a section through the friction bearing of FIG. 1 taken along the line II — II thereof.
Figure 3:
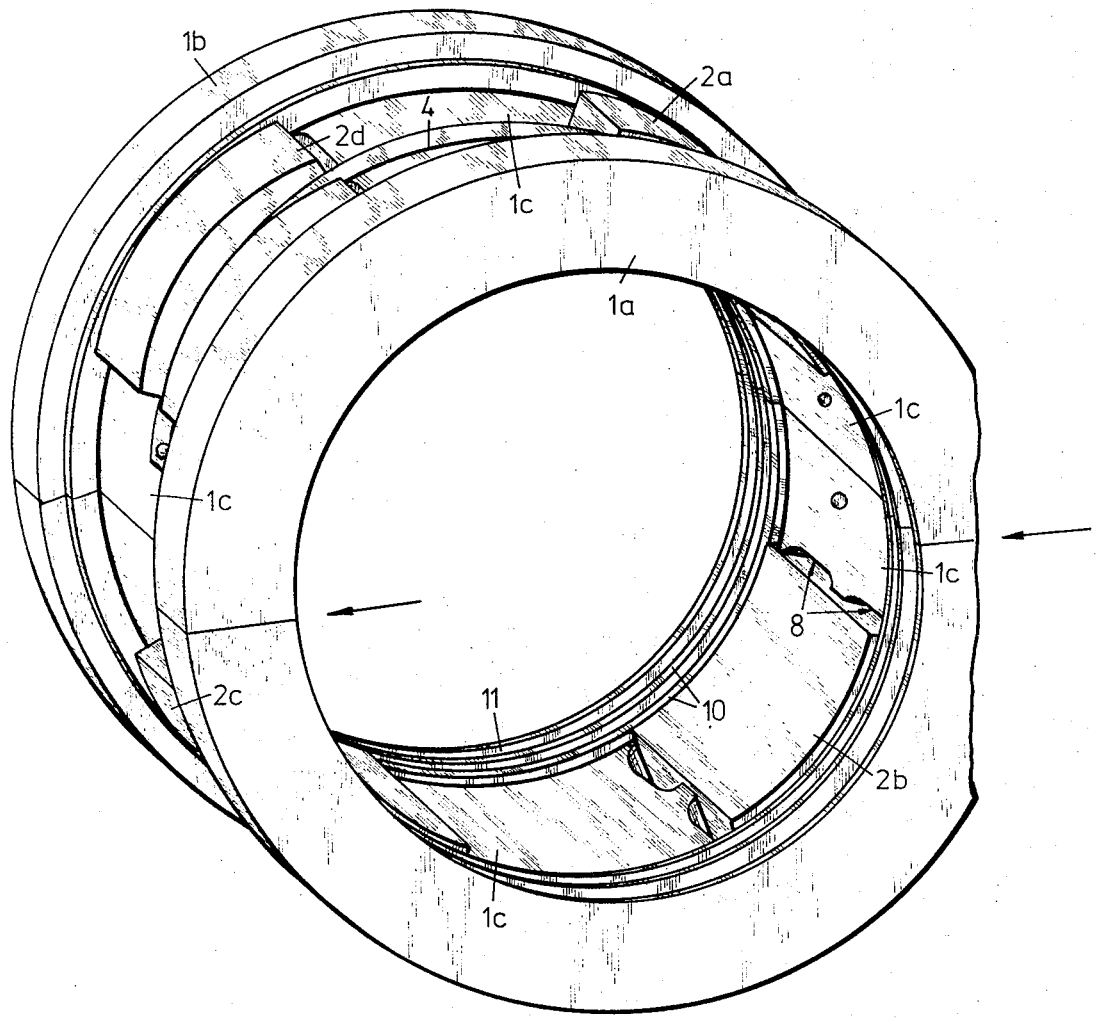
FIG. 3 shows an isometric view of the friction bearing of FIG. 1 but without the housing.

Starting from the heretofore known construction of a friction bearing which comprises a housing and at least three radial segments resting against the housing, the friction bearing according to the present invention is characterized primarily in that between the guiding cage and the radial segments, on the one hand, and the housing, on the other hand, there is located a fresh oil chamber which is open in circumferential direction. According to a further feature of the friction bearing according to the invention, openings are provided between the guiding cage and the radial segments for the passage of the lubricant.

The friction bearing according to the invention has the surprising advantage that the guiding cage fixes the radial segments as to their relative position with regard to each other and even in not yet assembled condition.

A further surprising advantage of the friction bearing according to the invention is seen in the fact that the guiding cage, with a special design of the radial segments, may simultaneously also be used for the lubricant supply, lubricant circulation and lubricant withdrawal.

In order to be able to attach the radial segments to the guiding cage even in not yet assembled or installed condition, it has proved expedient to provide the back of the radial segments with at least one groove extending in circumferential direction. A holding band may be inserted into this groove which holding band may outside the radial segments by means of rivets or the like be connected to the webs which interconnect the flanges of the guiding cage. In such an instance the radial segments are prevented from dropping out of the guiding cage either to the inside or to the outside. The arrangement of the groove extending in circumferential direction in the back of the radial segments has the effect that between the guiding cage and the housing there is at the same time formed an open fresh oil chamber which extends in circumferential direction. The supply of the fresh oil may be effected through a bore in the housing.

To assure that the lubricant will be able to pass from the fresh oil chamber into the lubricating gap between the contact surfaces of the radial segments and the shaft, it has been found expedient to provide openings between the webs and the radial segments for the passage of the oil. At the same time the webs may form protrusions between the openings against which the radial segments may rest in circumferential direction.

In order to prevent the oil from freely running out of the inner chamber of the guiding cage, it has proved advantageous to design the flanges of the guiding cage on their inner side toward the shaft so as to form a gap seal. At the same time, on the inner side of the flanges there may be provided a collecting groove for the oil which passes through the gap seal, the collecting gap being provided with a discharge opening.

According to a further development of the invention, the guiding cage may be split in axial or radial direction so that the friction bearing can be inserted also into the opening of a non-divided housing.

Referring now to the drawings in detail, the friction bearing illustrated therein comprises a guiding cage 1 composed of two lateral flanges 1a, 1b and webs 1c connecting the flanges to each other. Between the flanges 1c there are inserted radial segments 2a–2d which by means of their back rest against a housing 3 and which have their concave inner side support a shaft or the like (not illustrated).

To prevent the radial segments 2a–2d in non-assembled condition of the friction bearing from dropping out of the guiding cage 1 in radial direction, they are firmly held by means of holding bands 4 which by means of rivets 5 are connected to the webs 1c. The radial segments 2a–2d have their back provided with a groove 6 which extends in circumferential direction of the bearing and by means of which the holding bands 4 are guided. In circumferential direction the radial segments 2a–2d rest against protrusions 7 of the webs 1c while adjacent thereto openings 8 are provided for the passage of the lubricant.

Between the housing 3 and the guiding cage 1, the adjustable friction bearing forms a fresh oil chamber 9 which is open in circumferential direction and in which during operation a lubricant introduced through the housing 3 may be circulated so that the radial segments 2a–2d will practically be surrounded by the lubricant on all sides. In order to prevent the lubricant on the inner side of the bearing from freely flowing out of the gap between the flanges 1a, 1b and the non-illustrated shaft, the inside of the flanges 1a, 1b forms a gap seal 10. Outside of the seal 10, there is provided a collecting groove 11 for the escaping lubricant, this collecting groove 11 having its lower end provided with a discharge opening 12. The guiding cage 1 is fixed in the housing in circumferential direction by means of a bolt 13.

In the illustrated embodiment of the invention, the guiding cage 1 is so designed that it can be divided in radial direction in order to permit an easier handling of the guiding cage during the assembly of the bearing. However, it is also possible to design the guiding cage 1 in such a way that it can be divided in axial direction so that it can be inserted into non-divided housings.

The friction bearing with the guiding cage according to the invention has the advantage that it also permits in a very simple manner an adjustment of the bearing play. To this end it is merely necessary to provide the supporting surfaces in the housing with control surfaces which are designed as circular arcs in an orthogonal section with regard to the axis of the bearing and which have a radius of curvature which is greater than their distance from the bearing axis. When turning such a friction bearing inserted in circumferential direction in a housing having such control surfaces, the radial segments are adjusted in radial direction in such a way that the bearing play will change. This step is necessary in some instances of application in order to make sure that an optimum running characteristic of the friction bearing is obtained.

As will also be evident from the above, a friction bearing according to the present invention can be considerably easier handled than heretofore known friction bearings of the type involved. Moreover, in view of the structural design of the guiding cage, an optimum cooling by the circulating lubricant will be assured with a minimum of lubricant because the lubricant practically flows or washes around each radial segment from all sides.

It is, of course, to be understood that the present invention is by no means limited to the particular structure shown in the drawings but also comprises any modifications within the scope of the appended claims.

What I claim is:

1. A friction bearing which includes: housing means, circular cage means arranged within said housing means and having groove means therewith, and at least three radial segmental elements having a radial inner surface and a radial outer surface and being arranged in said cage means and spaced from each other in the circumferential direction of said cage means while resting against said housing means, the radial inner surface of said segmental elements being adapted to receive and rotatably to support a shaft, said cage means and said segmental elements together with said housing means defining lubricant receiving chamber means adapted to be supplied with lubricant in communication with the groove means, and said cage means and segmental elements defining with each other pasage means for permitting the passage of lubricant from said chamber means to the radial inner surface of said segmental elements for simultaneous lubrication and cooling of said radial segmental elements both in circumferential direction and also in radial direction, said cage means comprising an annular web section and lateral flange sections interconnected by said web sections and provided with circumferentially spaced cutouts for receiving said segmental elements, said web section having at least one wall of its cutouts provided with protrusion means for engagement with and supporting the respective segmental element in the respective cutout.

2. A friction bearing according to claim 1, in which the radial outer surface of said segmental elements is provided with groove means extending in the circumferential direction inside of said cage means.

3. A friction bearing according to claim 1, in which said flange sections are provided with collecting groove means for collecting lubricant escaping from around said segmental elements.

4. A friction bearing according to claim 1, in which said cage means is divided in radial direction thereof.

* * * * *